Dec. 18, 1962　　　　　　　T. L. DUTT　　　　　　3,069,634
MICROWAVE ARC-TYPE MODULATOR
Filed Dec. 12, 1958　　　　　　　　　　　　　　2 Sheets-Sheet 1

INVENTOR
TREVOR LAURENCE DUTT
BY
ATTORNEYS

Dec. 18, 1962   T. L. DUTT   3,069,634
MICROWAVE ARC-TYPE MODULATOR
Filed Dec. 12, 1958   2 Sheets-Sheet 2

INVENTOR
TREVOR LAURENCE DUTT
BY
ATTORNEYS

United States Patent Office 3,069,634
Patented Dec. 18, 1962

3,069,634
MICROWAVE ARC-TYPE MODULATOR
Trevor Laurence Dutt, Ickenham, Uxbridge, England, assignor to The General Electric Company Limited, London, England, a British company
Filed Dec. 12, 1958, Ser. No. 780,158
Claims priority, application Great Britain Jan. 13, 1958
9 Claims. (Cl. 332—8)

This invention relates to modulators designed for use in microwave systems.

One known form of such a modulator includes an electric discharge device disposed in a path (for example a waveguide) along which microwave energy can be propagated, the device including an elongated gas filled tube at opposite ends of which are disposed a pair of electrodes across which a modulating signal is applied in operation so that a discharge is alternately struck between the electrodes and then extinguished; the discharge interacts with the microwave energy and thereby attenuates it, and the frequency with which the potential difference is applied between the electrodes is arranged to be equal to the modulation frequency which it is desired to impose upon the microwave energy.

Such a modulator has certain disadvantages. For example, it has been found difficult to design such a modulator capable of imposing a modulation frequency greater than about 5 mc./s. The maximum modulation frequency which such a modulator can impose is limited by the recovery time of the discharge device, that is to say by the time taken for the discharge to be extinguished upon the removal of the potential difference between the electrodes. The discharge is extinguished by virtue of the ions forming the discharge being collected by the wall of the tube, and although the recovery time can be reduced by decreasing at least one dimension of the cross-section of the tube there are practical limits to such narrowing of the tube. Also, in order to maintain a sufficient number of ions in the discharge for satisfactory attenuation of the microwave energy, any decrease in the area of cross-section of the tube entails an increase in the length of the tube and a consequent increase in the magnitude of the potential difference applied between the electrodes required to establish the discharge.

It is accordingly an object of the present invention to provide a modulator in which one or more of the difficulties discussed above are alleviated.

According to the invention, a modulator includes a pair of electrodes disposed in a path along which microwave energy can be propagated and in an envelope filled with gas, the arrangement being such that upon the propagation of a microwave signal of an appropriate level along said path a microwave field will be set up between said pair of electrodes, means for establishing an electric discharge, including a region of high electron density, in the vicinity of said pair of electrodes, at least some of the electrons present in said region being arranged to interact with said microwave field, and means for applying a modulating signal so as to bring about variations in the degree of interaction between the electrons in said region and the microwave field and thereby modulate the microwave signal propagated along said path.

It should be understood that the term "gas" is to be construed as extending to a gas which is at a temperature below its critical temperature.

According to one aspect of the invention, a modulator includes an electrode system disposed in a path along which microwave energy can be propagated and in an envelope filled with gas, the electrode system consisting of a first electrode and a pair of discharge electrodes and the arrangement being such that upon the propagation of a microwave signal of an appropriate level along said path a microwave field will be set up between the first electrode and one of the discharge electrodes, means for establishing a substantially steady unidirectional discharge, including a region of high electron density, between the discharge electrodes, at least some of the electrons present in said region being arranged to interact with said microwave field, and means for applying a modulating signal to the first electrode so as to bring about variations in the degree of interaction between the electrons in said region and the microwave field and thereby modulate the microwave signal propagated along said path.

According to a further aspect of the invention, a modulator includes an electrode system, including at least three electrodes, disposed in a path along which microwave energy can be propagated and in an envelope filled with gas, the electrode system including a pair of electrodes arranged so that upon the propagation of a microwave signal of an appropriate level along said path a microwave field will be set up between said pair of electrodes, means for establishing a substantially steady unidirectional electric discharge, including a region of high electron density, between a pair of discharge electrodes included in the electrode system, at least some of the electrons present in said region being arranged to interact with said microwave field, means for biasing one of the electrodes of the electrode system, other than said discharge electrodes, positive with respect to the positive discharge electrode, and means for applying a modulating signal so as to bring about variations in the degree of interaction between the electrons in said region and the microwave field and thereby modulate the microwave signal propagated along said path.

Preferably, the biasing potential is within the range of 50 to 250 volts.

One arrangement in accordance with the invention will now be described by way of example with reference to the accompanying drawings, in which.

Figure 1:
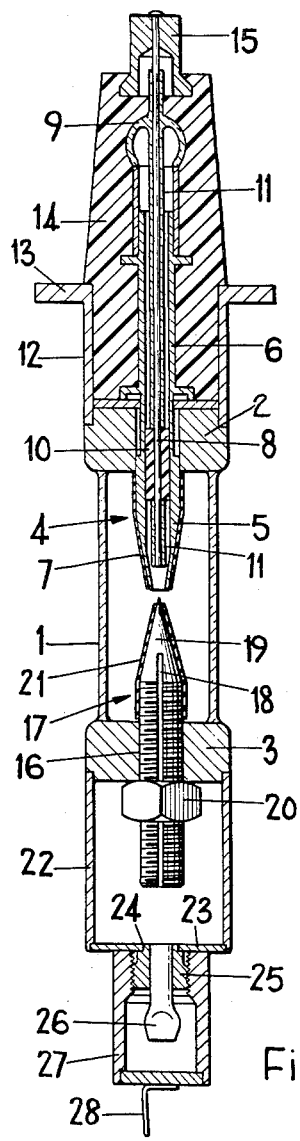
FIGURE 1 is a central sectional elevation of an electric discharge device forming part of a modulator designed for use in a microwave system intended for use at the so-called S band of frequencies.

Referring to FIGURE 1 of the drawings, the modulator utilizes a discharge device which includes a glass tube 1 filled with argon at a pressure of 6 millimetres of mercury, the tube 1 having an outside diameter of about 1.4 centimetres and having a length of about 3.4 centimetres. The ends of the tube 1 are respectively sealed to plane end faces of two circular cylindrical bushes 2 and 3 made of an alloy designed to match the thermal expansion of the tube 1, each bush 2 or 3 being coaxial with the tube 1 and having a slightly greater diameter than the tube 1.

The bush 2 surrounds and is in good electrical contact with part of an elongated hollow electrode generally designated 4 one end of which projects into the tube 1 almost as far as the center of the tube 1. This end of the electrode 4 is formed as a hollow truncated cone 5 tapering inwardly towards the end of the electrode 4, the inside diameter of the free end of the cone 5 being 0.18 centimetre, and the remainder of the electrode 4 is formed as a thin-walled sleeve 6 passing through the bush 2 and extending away from that end of the bush 2 remote from the tube 1. An electrically insulating sleeve 7 of synthetic mica is tightly fitted around that part of the electrode 4 disposed inside the tube 1, the sleeve 7 extending for substantially the whole length of said part of the electrode 4. A circular cylindrical rod 8, made of the same alloy as the bush 2, is coaxially disposed inside the electrode 4, the rod 8 being sealed through a glass support member 9 which is sealed to that end of the sleeve 6 remote from the bush 2 and being firmly supported inside the electrode 4 by means of a sleeve 10 of insulating material which is disposed around the rod 8 and fitted tightly inside the electrode 4; the rod 8 will hereinafter be referred to as the keep-alive electrode 8 of the device. One end of the keep-alive electrode 8 is disposed inside the cone 5 and is located 0.18 centimetre from the plane in which lies that end of the electrode 4 which is disposed in the tube 1, and the other end of the keep-alive electrode 8 projects beyond that side of the glass support member 9 remote from the tube 1. The cylindrical surfaces of those parts of the keep-alive electrode 8 which are disposed in the hollow electrode 4, other than the part surrounded by the insulating sleeve 10, are provided with glass coatings 11 so that the only part of the keep-alive electrode 8 in contact with the gas provided in the discharge device is that end face of the keep-alive electrode 8 disposed inside the cone 5. One end of a circular hollow metal cylinder 12 is sealed to that end of the bush 2 remote from the tube 1, the other end of the tube 12 being provided with an outwardly projecting radial flange 13.

A protective casing 14 of a suitable insulating material is molded around the glass support member 9 and that part of the hollow electrode 4 which is disposed outside the bush 2 and the tube 1. The open end of a metal cap 15 is embedded in the insulating casing 14, and that end of the keep-alive electrode 8 remote from the tube 1 is soldered to the closed end of the cap 15, the cap 15 being designed to form an electrical contact for the keep-alive electrode 8.

The bush 3 is provided with a threaded axial bore 16, and a solid electrode, generally designated 17 and in the form of a gunmetal rod provided with an external screw thread, is screwed into the bush 3 so that part of the electrode 17 projects into the tube 1 almost as far as the center of the tube 1. The electrode 17 is provided with a longitudinal slot 18 to enable gas to be pumped into or out of the tube 1. That end of the electrode 17 disposed inside the tube 1 is formed as a smooth cone 19, the tip of the cone 19 being centrally disposed with respect to the free end of the cone 5 and being disposed about 0.02 centimetre from the plane in which said end of the cone 5 lies. The other end of the electrode 17 projects beyond that main face of the bush 3 remote from the tube 1 and is provided with a lock-nut 20 to enable the electrode 17 to be fixed firmly in position relative to the bush 3. A further electrically insulating sleeve 21 of synthetic mica is tightly fitted around that part of the electrode 17 disposed inside the tube 1, the sleeve 21 extending for substantially the whole length of said part of the electrode 17.

The lock-nut 20 and that end of the electrode 17 projecting beyond that main face of the bush 3 remote from the tube 1 are surrounded by a circular hollow metal cylinder 22 one end of which is sealed to the periphery of said end face of the bush 3. A metal disc 23 having a centrally disposed aperture 24 is sealed at its periphery to the other end of the cylinder 22, and one end of a bush 25 provided with an external screw thread is sealed to the periphery of the aperture 24, the bush 25 tightly surrounding a copper pumping stem 26. During the manufacture of the discharge device, the tube 1 is evacuated and then filled with argon by means of the pumping stem 26, the stem 26 being sealed off when the desired pressure of argon in the tube 1 is obtained by pinching that end of the stem 26 remote from the disc 23. A metal cap 27, part of whose internal surface is threaded, is tightly screwed on to the bush 25 so as to form a protective casing for the free end of the pumping stem 26, and a metal tag 28 is soldered to the closed end of the cap 27, the tag 28 forming an electrical contact for the electrode 17.

Figure 2:
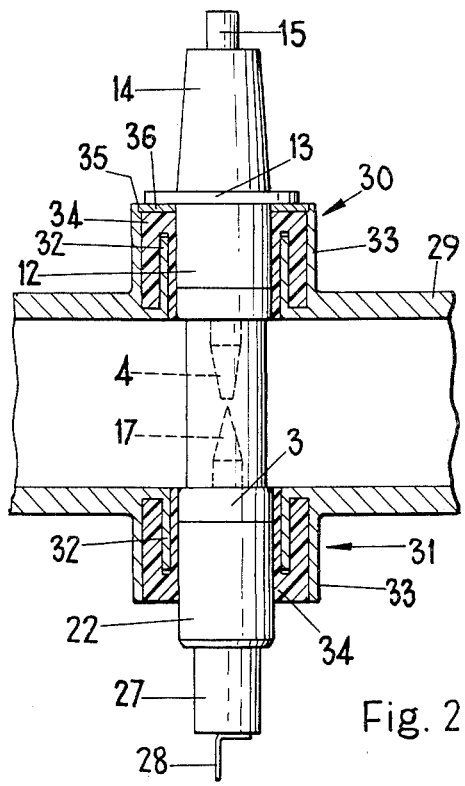
FIGURE 2 is a part sectional elevation of the combination of a portion of a waveguide with the device shown in FIGURE 1, the section being along the line II—II of FIGURE 3.
Figure 3:
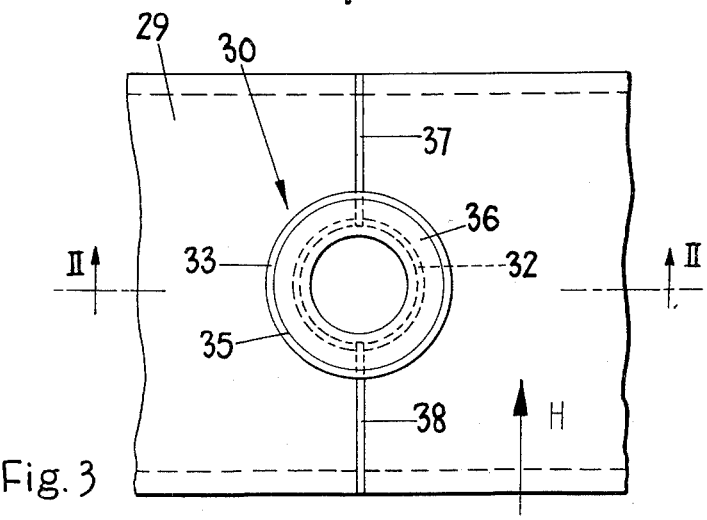
FIGURE 3 is a plan view of said portion of the waveguide with the electric discharge device removed.

Referring now particularly to FIGURES 2 and 3 of the drawings, the discharge device is mounted in a waveguide 29 of rectangular cross-section, the waveguide 29 having a narrow internal cross-sectional dimension of about 3.4 centimetres and a broad internal cross-sectional dimension of about 7.6 centimetres. The waveguide 29 includes two choke mountings generally designated 30 and 31 in which the bushes 2 and 3 are respectively disposed, those end faces of the bushes 2 and 3 to which the tube 1 is sealed being in register with the internal broad surfaces of the waveguide 29. The choke mountings 30 and 31 are so designed that there are closed circuits with respect to microwave energy between said end faces of the bushes 2 and 3 and the surrounding parts of the internal broad faces of the waveguide 29; it should be understood that if there were an open circuit with respect to microwave energy between either of said end faces of the bushes 2 and 3 and the surrounding part of the waveguide 29, part of the energy propagated by the waveguide 29 would be lost by being radiated from the waveguide 29 through the open circuit or circuits.

Each choke mounting 30 or 31 includes two circular hollow metal cylinders 32 and 33 which are each secured to, and project perpendicularly from, the relevant broad wall of the waveguide 29. The cylinders 32 and 33 of each choke mounting 30 or 31 surround, and are disposed coaxially with respect to, the relevant bush 2 or 3, the cylinder 33 surrounding and extending for a short distance beyond the free end of the cylinder 32. It will be appreciated that each choke mounting 30 or 31 essentially comprises an annular channel for microwave energy having a substantially U-shaped cross-section, the base of the U being remote from the waveguide 29, one of the arms of the U being bounded by the outer surface of the relevant part of the discharge device and the inner surface of the cylinder 32, and the other arm of the U being bounded by the outer surface of the cylinder 32 and the inner surface of the cylinder 33. The channel of each choke mounting 30 or 31 is filled with a suitable electrically insulating material 34 such as polythene. That arm of each U adjacent the discharge device opens at its end into the interior of the waveguide 29 while the other arm is closed at its end, and the effective length of each U-shaped path is arranged to be substantially equal to half the wavelength corresponding to the microwave frequency at which the modulator is designed to be used; thus a closed circuit with respect to the microwave energy propagated by the waveguide 29 will be formed at the opening of each U-shaped path into the waveguide 29 so that the internal surface of the waveguide 29 will be effectively unbroken with respect to the microwave energy.

A circumferential recess 35 is formed in the inner surface of the cylinder 33 of the choke mounting 30 at the free end of the cylinder 33, and the outer periphery of a metal washer 36 fits in the recess 35. With the discharge device mounted in position in the waveguide 29 as shown in FIGURE 2 of the drawings, the flange 13 of the discharge device bears against that face of the washer 36 remote from the waveguide 29; thus, it will be appreciated that the washer 36 in combination with the flange 13 serves as a means for electrically connecting the hollow electrode 4 to the waveguide 29 with respect to direct current and for locating the discharge device in its desired position in the waveguide 29. On the other hand, it will be appreciated that the choke mounting 31 provides a means for electrically insulating the solid electrode 17 from the waveguide 29 with respect to direct current.

The portion of the waveguide 29 in which the discharge device is disposed is provided with an inductive element in the form of two identical thin metal vanes 37 and 38 which respectively extend from opposite narrow faces of the waveguide 29 perpendicular to the length of the waveguide 29, the vanes 37 and 38 being aligned with each other and with the axis of the discharge device mounted in the waveguide 29.

With the discharge device inserted in position in the portion of the waveguide 29 there is formed a low Q resonant system of which the inductive element constituted by the metal vanes 37 and 38 and a capacitative element formed by the electrodes 4 and 17 each forms a part. The spacing of the tip of the electrode 17 from the electrode 4 is adjusted during the manufacture of the discharge device by screwing the electrode 17 in one direction or the other through the bush 3 until the resonant system has a resonant frequency equal to the desired mean operating frequency of the system in which the modulator is to be used. The electrode 17 is then fixed in its final position by means of the lock-nut 20.

Figure 4:
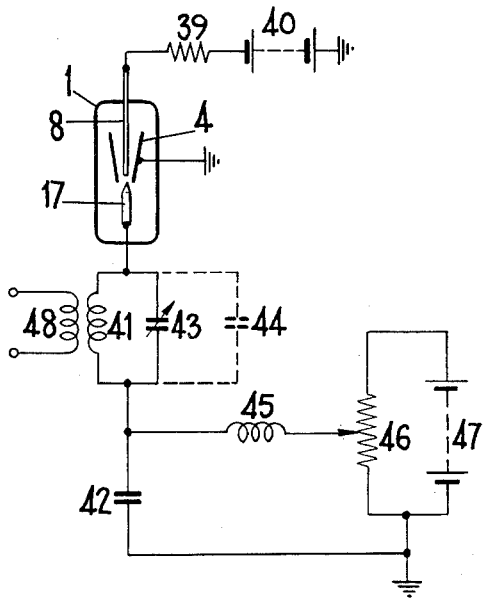
FIGURE 4 is a circuit diagram of the modulator.

Referring now particularly to FIGURE 4 of the drawings, the following electrical connections are made to the discharge device mounted in the waveguide 29 as described above. The hollow electrode 4 of the discharge device is earthed by connecting the wall of the waveguide 29 to earth, and the keep-alive electrode 8 is connected via a resistor 39 having a value of 0.5 megohm to the negative terminal of a power supply 40 designed to supply a substantially steady unidirectional voltage of between 650 and 800 volts, the positive terminal of the supply 40 being earthed. Thus, in operation a potential difference will be applied between the keep-alive electrode 8 and the electrode 4, and this potential difference is sufficient to maintain a direct current discharge between the electrode 4 and that end of the keep-alive electrode 8 adjacent the cone 5. The electrode 17 to connected to earth via a coil 41 constituted by a few turns of wire and a fixed capacitor 42 having a value of 0.01 microfarad. A variable capacitor 43 having a maximum value of 50 micromicrofarads is connected in parallel with the coil 41, and the capacitance 44 of the choke mounting 31 is effectively connected in parallel with the coil 41. The capacitor 43 is adjusted so that the resonant circuit formed by the coil 41, the capacitor 43 and the capacitance 44 has a resonant frequency of 100 mc./s. The connection between the capacitor 42 and the parallel combination of the coil 41 and the capacitor 43 is connected via a second coil 45, which is constituted by about 100 turns of wire and which has an inductance of 5.6 microhenries, to the moving contact of a resistive potentiometer 46. The ends of the potentiometer 46 are respectively connected to the terminals of a high tension battery 47 the negative terminal of which is earthed, and the potentiometer 46 is adjusted so that the electrode 17 is biased in operation to a positive potential of about 200 volts with respect to earth. The capacitor 42 and the coil 45 together form a filter such that the connection between the capacitor 42 and the parallel combination of the coil 41 and the capacitor 43 is maintained in operation at earth potential with respect to radio frequencies. A further coil 48, again constituted by a few turns of wire, is coupled with the coil 41 and is designed to supply a modulating signal having a frequency of 100 mc./s. to the resonant circuit formed by the coil 41, the capacitor 43 and the capacitance 44; the modulating signal has a peak-to-peak amplitude of about 100 volts. Thus, in operation, an alternating potential difference having a frequency of 100 mc./s. is maintained between the electrodes 4 and 17 of the discharge device.

The operation of the modulator is as follows. When a microwave signal is propagated along the waveguide 29 and is incident on the resonant system, a strong microwave field is set up between the electrodes 4 and 17 of the discharge device. The level of the microwave signal is arranged to be sufficiently low to ensure that this field does not itself give rise to a discharge between the electrodes 4 and 17. The discharge between the keep-alive electrode 8 and the electrode 4 includes a region of high electron density (the negative glow region of the discharge) and the electrons in this region interact with said microwave field and thereby attenuate the microwave signal propagated by the waveguide 29. The effect of the modulating signal is to bring about a variation in the degree of interaction between the electrons in said region and the microwave field; such interaction varies at the modulation frequency so that the microwave signal is amplitude modulated at a frequency of 100 mc./s. It is thought that such variation in the interaction is brought about by the electrons in said region being alternately shifted into an out of the region of maximum microwave field beween the electrodes 4 and 17. In the present arrangement it is thought that a major portion of the electrons present in said region of the discharge move into and out of the hollow electrode 4, and it should be appreciated that such a condition is desirable from the point of view of reducing the noise generated by the device in operation. It should be understood that the electrons present in said region of the discharge are prevented from dispersing unduly by virtue of the presence of positive ions in the discharge.

After it has been modulated, the microwave signal includes two side-bands and it is desirable that the ratio of the energy residing in the side-bands to that residing in the carrier wave should be as large as possible. It has been found that, if the electrode 17 is maintained in operation at earth potential, the power residing in each of the side-bands is less than that residing in the carrier wave by 25 decibels, whereas, if the electrode 17 is biased in operation at a positive potential of about 200 volts as in the arrangement described above, the power residing in each of the side-bands is less than that residing in the carrier wave by only 15 decibels. Thus, by biasing the electrode 17 positively, much greater modulation depth of the microwave signal can be obtained. It is thought that the effect of the biasing potential on the electrode 17 is to increase the concentration of electrons from the electric discharge in the vicinity of the gap between the electrodes 4 and 17, this increased concentration being responsible for the increased modulation depth of the microwave signal. Moreover, it is found that the provision of the insulating sleeves 7 and 21 enables a further increase in the modulation depth of the microwave signal to be obtained; in this connection the effect of the sleeve 21 is more significant than that of the sleeve 7. Again, it is thought that the provision of the sleeves 7 and 21 has the effect of bringing about an increase in the concentration of electrons from the electric discharge in the vicinity of the gap between the electrodes 4 and 17.

Also, it is found that the modulation depth is apparently increased when a unidirectional magnetic field H is applied across the discharge device transversely to the axis of the tube 1 as indicated in FIGURE 3; a suitable magnitude for such a magnetic field used with the above arrangement has been found to be about 100 oersteds.

Other arrangements different from that described above by way of example could also possibly be used. For example, the keep-alive electrode 8 described above could be replaced by an electrode of the side-arm type; in this arrangement, the steady unidirectional electric discharge could be maintained in operation between this side-arm electrode and one or both of the electrodes 4 and 17 forming the radio frequency discharge gap, and the modulating and biasing potentials could be applied to a second side-arm electrode or to one of the electrodes 4 and 17. In another arrangement, the region of high electron density could possibly be produced by means of a thermionic cathode associated with suitable focussing means arranged to prevent undue dispersion of the electrons.

I claim:

1. A modulator including a path along which microwave energy can be propagated, an envelope filled with gas, an electrode system disposed in said envelope and in said path, the electrode system consisting of a first electrode and a pair of discharge electrodes and the arrangement being such that upon the propagation of a microwave signal of an appropriate level along said path a microwave field will be set up between the first electrode and one of the discharge electrodes, means for establishing a substantially steady unidirectional gas discharge, including a region of high electron density, between the discharge electrodes, at least some of the electrons present in said region being arranged to interact with said microwave field, and means for applying a modulating signal to the first electrode so as to bring about variations in the degree of interaction between the electrons in said region and the microwave field and thereby modulate the microwave signal propagated along said path while allowing the number of electrons present in said electric discharge to remain substantially constant.

2. A modulator according to claim 1, in which a resonant circuit including a first coil is connected between the first electrode and one of said discharge electrodes, the modulating signal being arranged to be applied to the modulator via a second coil coupled with the first coil.

3. A modulator according to claim 1, including means for biasing the first electrode positive with respect to the positive discharge electrode.

4. A modulator according to claim 3, in which the biasing potential is within the range of 50 to 250 volts.

5. A modulator according to claim 1, in which the first electrode is elongated, has an end disposed adjacent said discharge electrodes, and is surrounded by an electrically insulating sheath so that in operation the only part of the biased electrode which comes into contact with said region is said end.

6. A modulator according to claim 1, in which all the electrodes are elongated with ends disposed adjacent one another and are respectively surrounded by electrically insulating sheaths so that in operation the only parts of the electrodes which come into contact with said region are said ends.

7. A modulator according to claim 1, in which the envelope is filled with an inert gas.

8. A modulator according to claim 1, in which said path is in the form of a hollow waveguide.

9. A modulator according to claim 1, including means for applying a magnetic field across said envelope transversely to said microwave field.

References Cited in the file of this patent

UNITED STATES PATENTS

| | | |
|---|---|---|
| 2,047,929 | Linder | July 14, 1936 |
| 2,051,537 | Wolff et al. | Aug. 18, 1936 |
| 2,106,770 | Southworth | Feb. 1, 1938 |
| 2,765,445 | Zaleski | Oct. 2, 1956 |
| 2,775,739 | Knol | Dec. 25, 1956 |
| 2,825,877 | Hopper | Mar. 4, 1958 |

FOREIGN PATENTS

| | | |
|---|---|---|
| 682,949 | Great Britain | Nov. 19, 1952 |

OTHER REFERENCES

Pringle et al.: "Gas Discharge Tubes for Control of Microwave Attenuation," Journal of Scientific Instruments, September 953, volume 30, No. 9, pages 320–323.